United States Patent [19]
Fawal et al.

[11] Patent Number: 5,966,382
[45] Date of Patent: Oct. 12, 1999

[54] NETWORK COMMUNICATIONS USING SINE WAVES

[75] Inventors: Marwan A. Fawal, Santa Clara; Burton B. Lo, San Francisco, both of Calif.

[73] Assignee: 3Com Corporation, Santa Clara, Calif.

[21] Appl. No.: 08/866,566

[22] Filed: May 30, 1997

[51] Int. Cl.[6] .................... H04L 12/28; H04L 12/413; H04J 3/16

[52] U.S. Cl. .................... 370/419; 370/445; 370/466

[58] Field of Search .................... 370/293, 308, 370/445, 446, 465, 466, 419, 434; 331/177, 184

[56] References Cited

U.S. PATENT DOCUMENTS

| | | | |
|---|---|---|---|
| 4,032,718 | 6/1977 | O'Neill | 370/308 |
| 5,450,490 | 9/1995 | Jensen et al. | 380/6 |
| 5,541,959 | 7/1996 | Myers | 375/348 |
| 5,572,511 | 11/1996 | Ouyang et al. | 370/445 |

OTHER PUBLICATIONS

Stremler, Ferrel G., "Introduction to Communication Systems" Second Edition, Addison–Wesley Publishing, Reading, Massachusetts, (1977) Chapters 7 and 10, pp. 351–429, 571–633.

*Primary Examiner*—Chau Nguyen
*Assistant Examiner*—Phuong chau Ba Nguyen
*Attorney, Agent, or Firm*—Kent R. Richardson; Wilson, Sonsini, Goodrich & Rosati

[57] ABSTRACT

A system comprising the following elements. An ethernet controller circuit for generating ethernet data signals. An isolation circuit coupled to receive the ethernet data signals and for generating ethernet output signals. The ethernet output signals including primarily a first sine wave signal, a second sign wave signal, and a set of signals. The first sine wave signal is at a frequency approximately equal to the frequency of the ethernet data signals. The second sine wave signal is at a frequency approximately one half the frequency of the first sine wave signal. The third set of signals is for transitioning between said first sine wave signal and said second sine wave signal. In this embodiment, the high frequency components of the output signals is significantly reduced, which results in reduced electromagnetic interference from the system.

15 Claims, 8 Drawing Sheets

NETWORK COMMUNICATIONS USING SINE WAVES

1. THE BACKGROUND OF THE INVENTION a. The Field of the Invention

This invention relates to the field of network communications. In particular, the invention relates to a network where devices communicate using sinusoidal waves.

b. Background Information

Ethernet is an industry standard (e.g., IEEE 802.3 specification) method of communicating between various devices in a local area network. For example, a computer includes a network interface card (NIC) that formats ethernet data for transmission onto a network cable. The network cable carries the ethernet formatted packets out to the rest of the network. The data signal is generated to comply with a particular specification for that type of ethernet communications. For example, the ethernet data signal might be generated to comply with the ANSI/IEEE standard 802.3 ethernet voltage template. This voltage template applies to five and ten MHz ethernet data communications. Complying with the voltage template ensures that the NIC will not damage other devices connected to the network cable, and ensures that other devices will be able to properly receive and decode the signals from the NIC.

As part of the FCC's (and other national regulatory bodies) electromagnetic interference regulations, the NIC must not emit an amount of electromagnetic radiation above a preset limit. The FCC (or for Europe, the CISPR-B) specification, for example, limits the radiation from the ethernet NIC. Importantly, any multiples of the fundamental frequency are to be less than twenty-seven DB lower than the fundamental frequency, per the 802.3 specifications. For example, when driving an all-ones Manchester encoded signal, any harmonic measured shall be at least twenty-seven dB below the fundamental. One problem with generating the ethernet signal to comply with the ethernet voltage template is that high frequency noise may also be generated. This high frequency noise typically appears as an unacceptably high electromagnetic radiation signal at the connection between the NIC and the network cable. These high frequency signals can cause the network interface card to not comply with the FCC electromagnetic interference requirements.

One prior art NIC is shown in FIG. 1. This NIC is available from 3COM Corporation of Santa Clara, Calif. The NIC 100 is for generating the transmit signal 130 which corresponds to an ethernet transmit signal. The transmit signal is generated to support Manchester encoding of the ethernet data. The transmit signal 130 is approximately a square wave signal. The prior art system of FIG. 1 uses a square wave in combination with a pre-emphasis wave. Each of these waves are ten MHz and staggered five MHz but the combination provides a partially shaped wave form as shown in the transmit signal 130. The partially shaped wave form helps to meet the voltage template of the transmit signal 130.

This paragraph describes the operation of the NIC 100. The NIC 100 includes an ethernet controller 101, some filtering circuits, and a transformer. The ethernet controller 101 generates ethernet data signals and includes a number of digital output signals. These output signals include the twisted pair pre-emphasis minus 102, the twisted pair data plus 104, the twisted pair pre-emphasis plus 106, and the twisted pair data minus 108. The twisted pair data plus 104 and the twisted pair data minus 108 output signals that correspond to the positive portion and the negative portion of the transmit signal 130. The twisted pair pre-emphasis minus 102 and the twisted pair pre-emphasis plus 106 help shape the transmit signal 130 to better comply with the voltage template of the IEEE 802.3 specification. The circuitry between the outputs of the ethernet controller 101 and the transformer 120 helps combine the outputs into the one transmit signal 130. The transformer 120 includes a seven pole filter which shapes the transmit signal 130 and reduces the high frequency components in the transmit signal 130.

The NIC 100 operates quite well for many applications. However, the external circuitry on the NIC 100 adds to the costs of manufacturing the NIC 100. Therefore, it is desirable to generate the transmit signal with few external components. Additionally, the electromagnetic interference should be kept to a minimum.

2. A SUMMARY OF THE INVENTION

A network including network devices using sinusoidal waves to communicate is described.

One embodiment of the invention includes a system comprising the following elements. An ethernet controller circuit for generating ethernet data signals. An isolation circuit coupled to receive the ethernet data signals and for generating ethernet output signals. The ethernet output signals including primarily a first sine wave signal, a second sign wave signal, and a set of signals. The first sine wave signal is at a frequency approximately equal to the frequency of the ethernet data signals. The second sine wave signal is at a frequency approximately one half the frequency of the first sine wave signal. The third set of signals is for transitioning between said first sine wave signal and said second sine wave signal. In this embodiment, the high frequency components of the output signals is significantly reduced, which results in reduced electromagnetic interference from the system.

In one embodiment, a double integration circuit first integrates at least a first square wave to produce a triangle wave. The triangle wave is then integrated to generated a sine wave that varies between the frequency of the first sine wave signal and the second sine wave signal. This variation corresponds to a Manchester encoding of ethernet data.

In another embodiment, the double integration circuit is replaced by a digital to analog circuit and memory. The memory includes the values to generate approximations of sine waves that vary between the frequency of the first sine wave signal and the second sine wave signal.

Although many details have been included in the description and the figures, the invention is defined by the scope of the claims. Only limitations found in those claims apply to the invention.

3. A BRIEF DESCRIPTION OF THE DRAWINGS

The figures illustrate the invention by way of example, and not limitation. Like references indicate similar elements.

Figure 4:
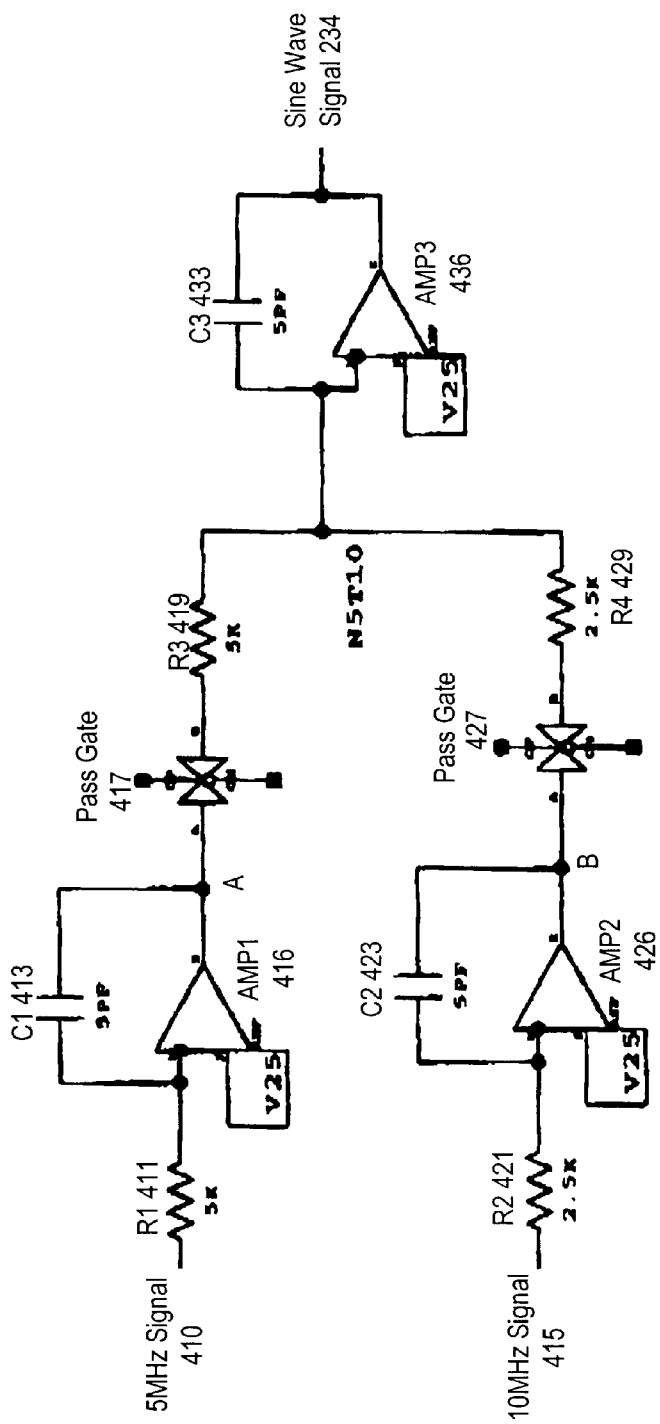

FIG. 4 a double integration system for generating ethernet signals according to one embodiment of the invention.

Figure 5:
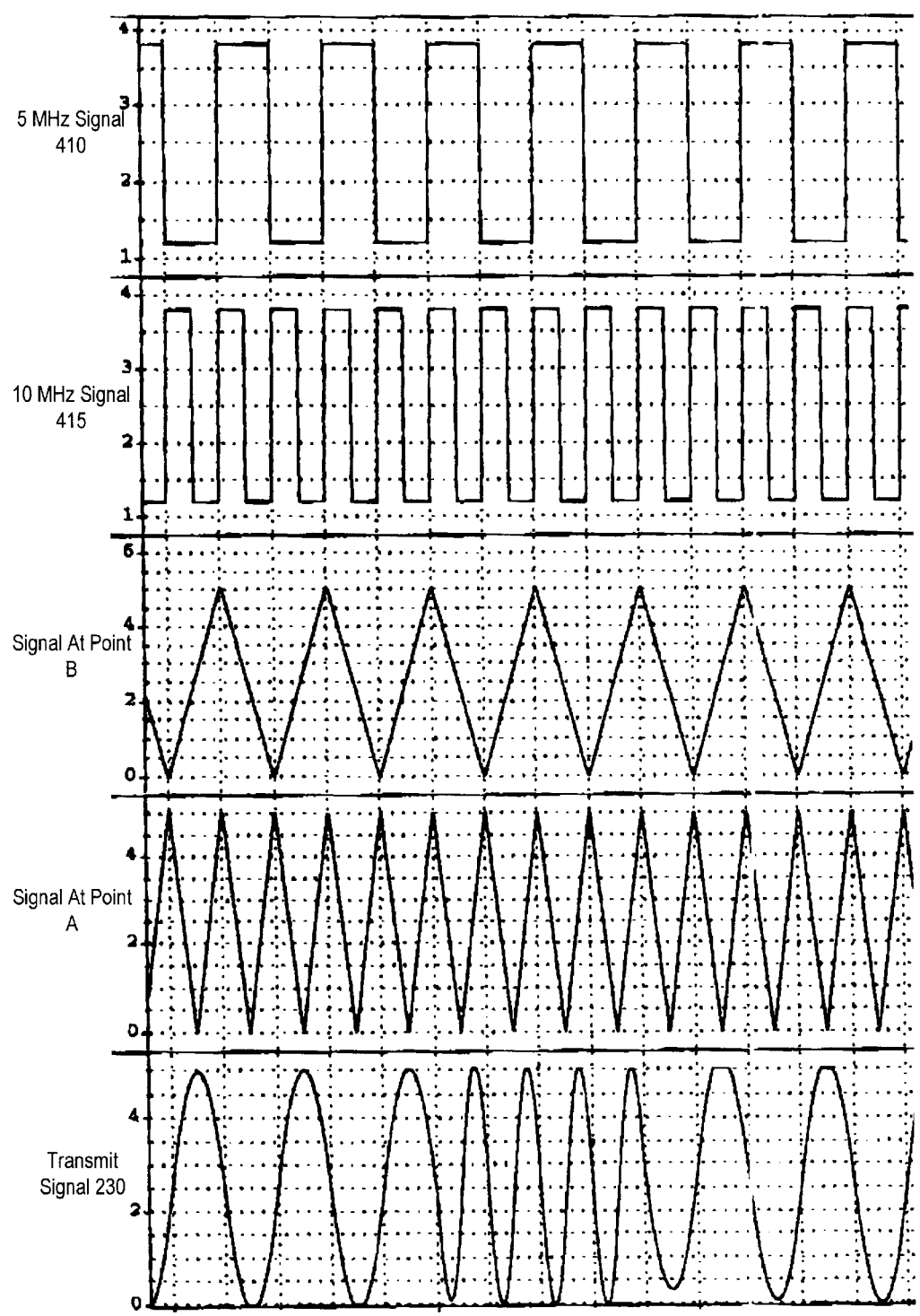

FIG. 5 illustrates the values of various signals in the system of FIG. 4.

Figure 6:
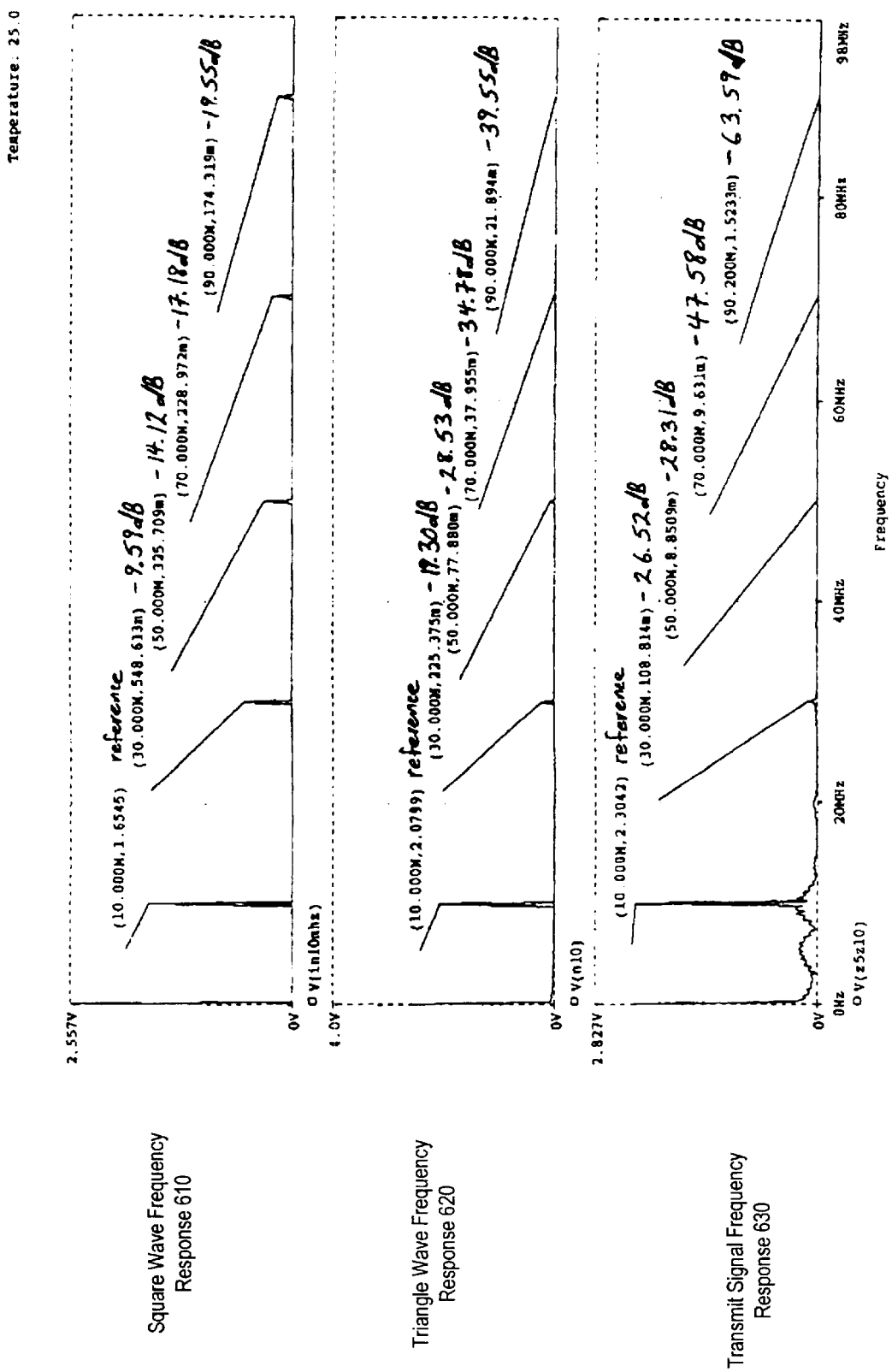

FIG. 6 illustrates the values of various signals in the system of FIG. 4.

Figure 7:
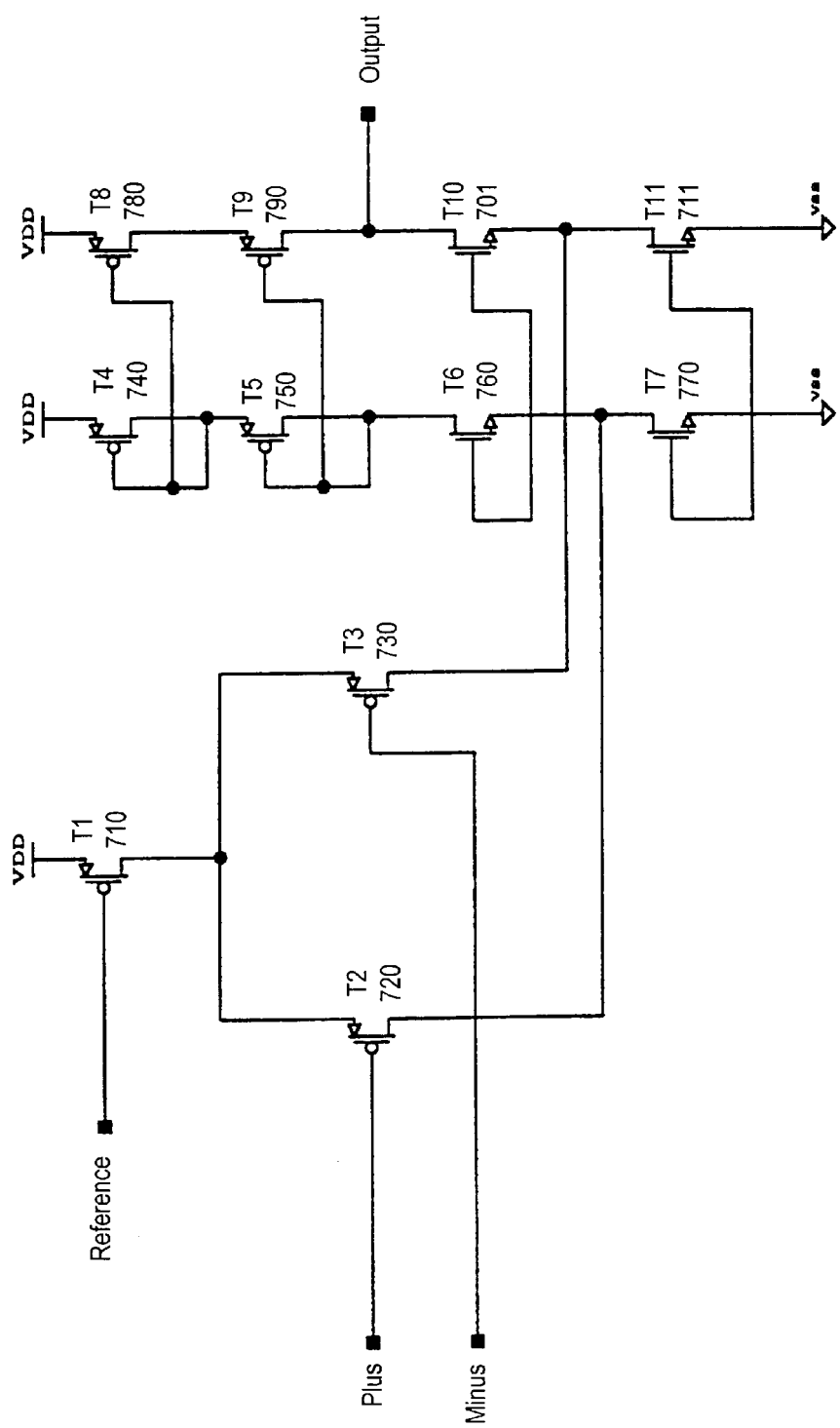

FIG. 7 illustrates the frequency response at various points in the system of FIG. 4.

Figure 8:
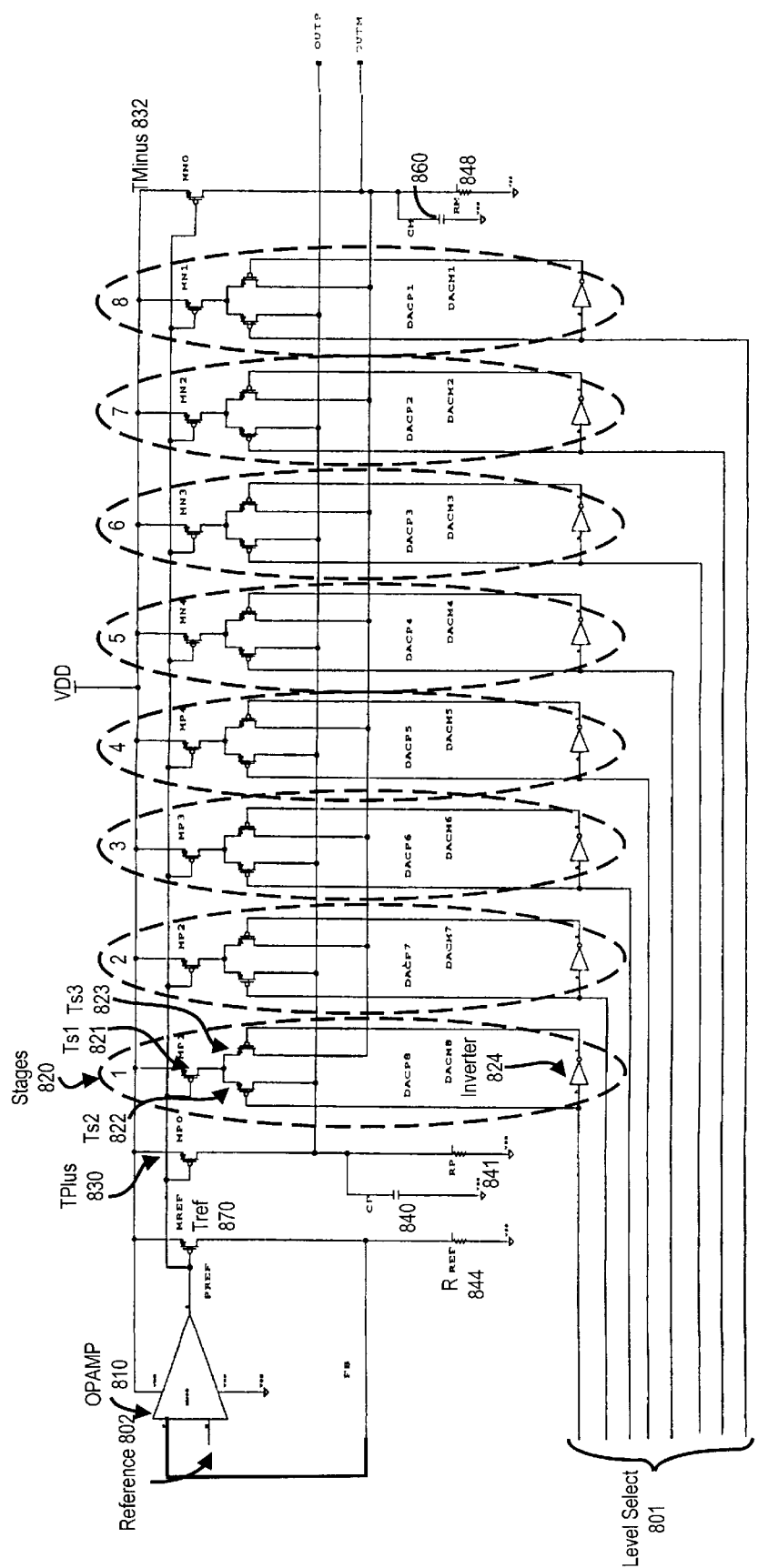

FIG. 8 illustrates another system for generating the signals for one embodiment of the invention.

4. THE DESCRIPTION a. An Overview of Some Embodiments of the Invention

In one embodiment of the invention, a network interface card includes an ethernet controller for generating an ethernet transmit signal. The ethernet transmit signal is made from two signals: a five MHz sine wave, and a ten MHz sine wave. The ethernet transmit signal is also made from additional sine waves that provide a smooth transition when the ethernet transmit signal changes from five MHz to ten MHz and vice-versa. Importantly, the ethernet transmit signal has significantly lower power levels for many of the high frequency signal components found in prior art systems. Thus, this embodiment of the invention provides better electromagnetic interference characteristics than prior art systems.

In one embodiment of the invention, a double integration circuit combines two square wave data signals. A first integration stage separately integrates the two square waves to generate a two triangle waves. A second integration stage combines the two triangle waves and integrates the resulting combination to generate a sine wave. The sine wave is then buffered and fed to an isolation transformer. The isolation transformer may optionally perform additional filtering on the sine wave. The output of the isolation transformer is the output ethernet signal.

In another embodiment, a digital to analog converter, in combination with a lookup table, generates an approximated sine wave output signal. The approximated sine wave is then fed to a filter and an isolation transformer. The output from the isolation transformer is the output ethernet signal.

b. Network Interface Card

The following describes the network interface card using the double integration circuit. After the description of the double integration circuit, a description of the digital to analog converter circuit is provided.

Figure 2:
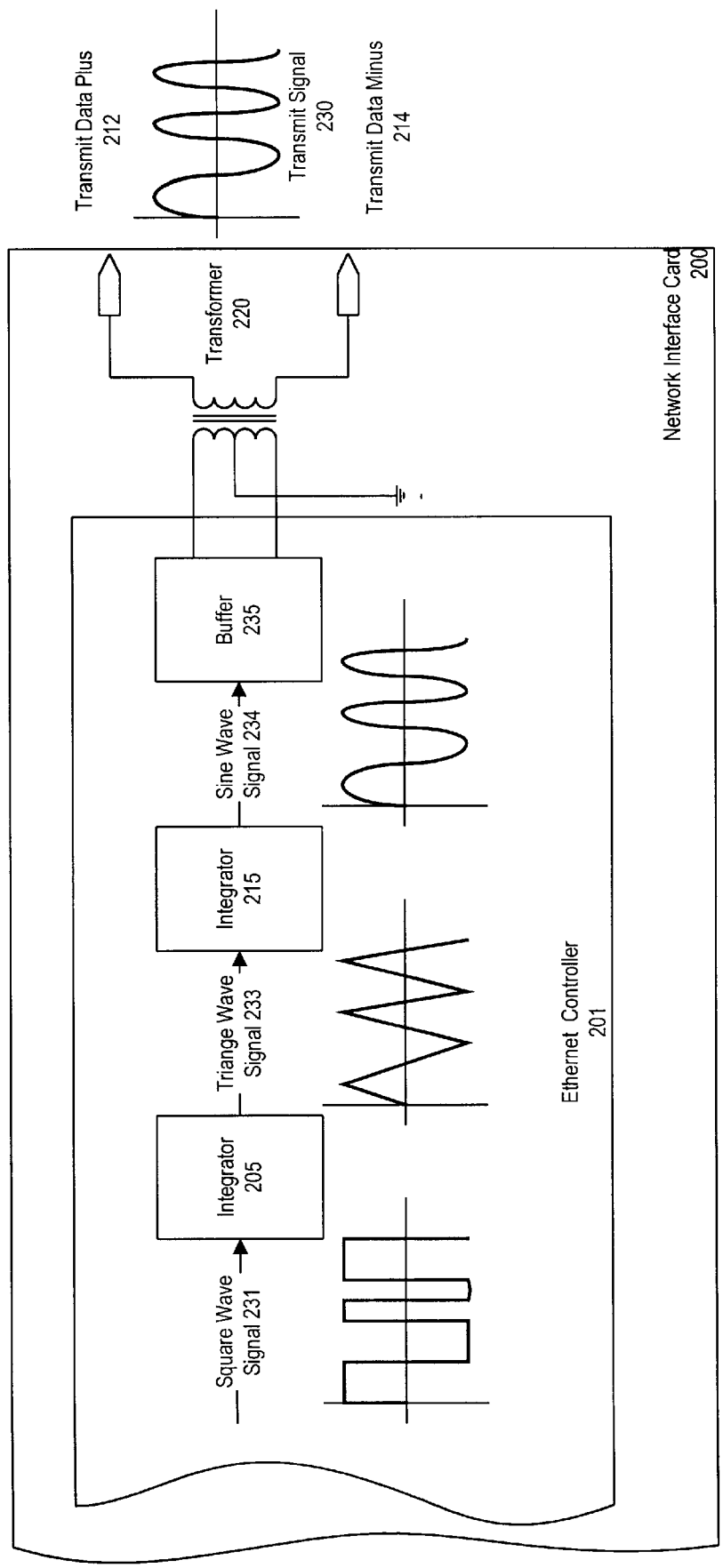
FIG. 2 illustrates a network interface card including one embodiment of the invention.

FIG. 2 illustrates a network interface card 200 including a double integration circuit according to one embodiment of the invention. Note that the output of the NIC 200 is a sine wave that varies between two frequencies. Importantly, this output signal includes relatively small levels of signals that are not a fundamental frequency, one half the fundamental frequency, or are needed to transition between the fundamental frequency and one half the fundamental frequency. (Note, this last set of frequencies make the transition between the two frequencies possible.)

The following lists the elements of FIG. 2, then the signals sent between the elements, and then describes the elements and their operations. The network interface card 200 includes an ethernet controller 201 and a transformer 220. The ethernet controller 201 includes an integrator 205, an integrator 215, and a buffer 235. A square wave signal 231, corresponding to the Manchester encoding of the ethernet data, is provided to the input of the integrator 205. The integrator 205 produces a triangle wave signal 233 from the integration of the square wave signal 231. The triangle wave signal 233 is provided to the input of the integrator 215. The integrator 215 then generates a sine wave signal 234 from the integration of the triangle wave signal 233. The sine wave signal 234 is fed to the buffer 235, which in turn outputs a signal for the transformer 220. The output of the transformer 220 is the transmit signal 230.

Figure 1:
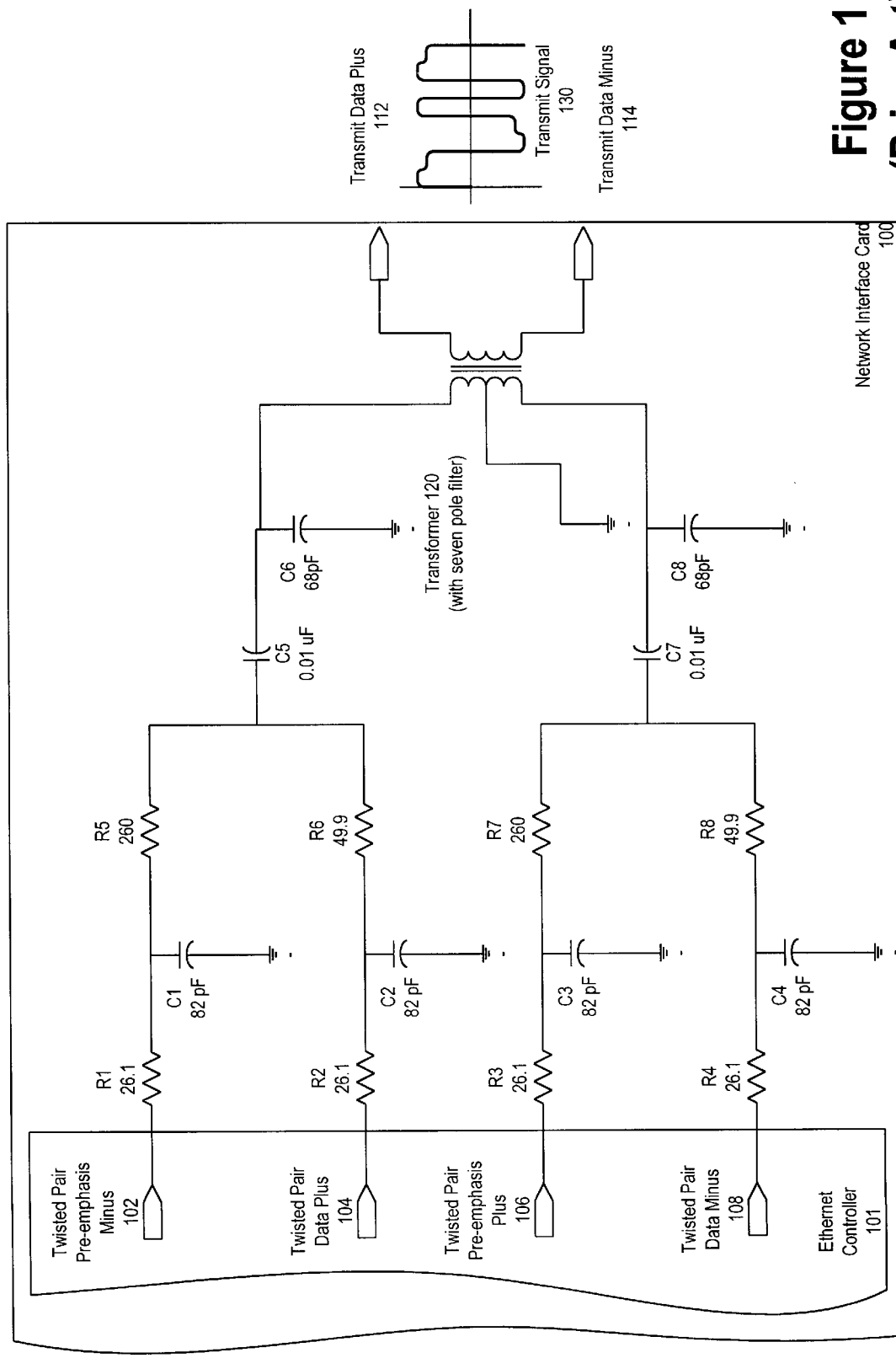
FIG. 1 illustrates a portion of a prior art network interface card and an example output waveform.

The ethernet controller 201, in one embodiment, includes an application-specific integrated circuit and includes the functions necessary to comply with the ethernet communication standards for transmitting ethernet data packets, for example, as described in the IEEE 802.3 specification. Note that in this embodiment, many of the external circuits found in FIG. 1 are not needed. This reduces the cost of the components in the NIC 200 and helps improve the reliability of the NIC 200.

The integrator 205 and the integrator 215 are described in greater detail below. However, what is important is that the output of these two circuits is a signal with significantly lower power high frequency signal components.

The buffer 235 includes a voltage follower buffer/driver circuit that is capable of driving 25 milliamps. The buffer 235 is illustrative of a circuit for ensuring the transformer is supplied a signal of sufficient power for the transmit signal 230. Other embodiments of the invention, for example, include the buffer 235 located off the ethernet controller 201.

The transformer 220 electrically isolates the NIC 200 from the network cable. The data transmit plus 212 and the data transmit minus 214 connect to the positive and negative terminals of the network cable. Across these two outputs is the transmit signal 230.

Note that the transmit signal 230 is a combination of two sine waves. In one embodiment supporting ten megabit ethernet communications, the first sine wave has a ten MHz frequency, and the second sine wave has a five MHz frequency. Importantly, the electromagnetic interference associated with such a wave form is less than previous systems.

Figure 3:
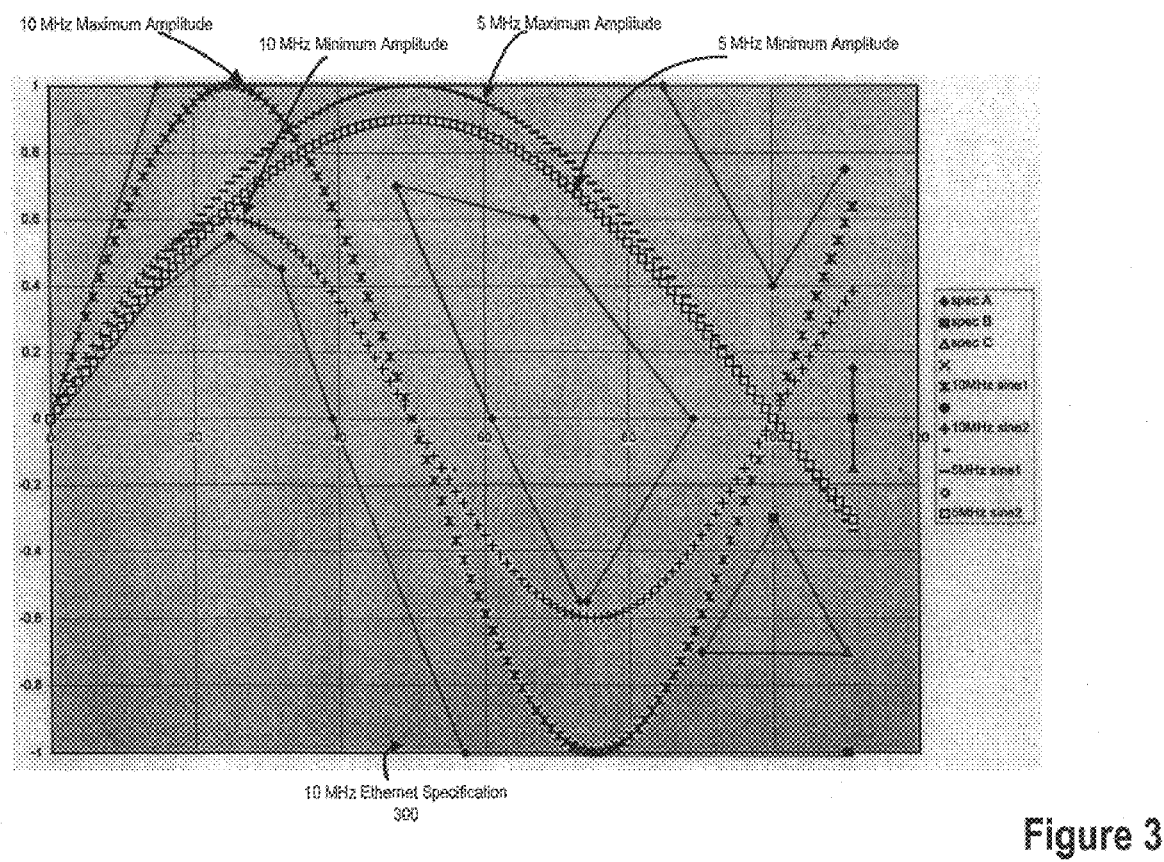
FIG. 3 illustrates a template defining the constraints of the signals generated by one embodiment of the invention.

FIG. 3 illustrates the ten MHz ethernet specification template 300. The template 300 illustrates the maximum and minimum relative amplitudes of the ten MHz sine wave and a five MHz sine wave in the transmit signal 230. These maximum and minimum values apply to the double integration circuits and well as the digital to analog conversion circuits. In other embodiments of the invention, these maximum and minimum values are exceeded and do not completely conform to the voltage template.

c. Double Integration Circuit

FIG. 4 illustrates an embodiment of a double integration circuit that combines the five MHz square wave signal with a ten MHz square wave signal to generate the transmit signal 230. This double integration circuit replaces the integrator 205 and the integrator 215 of FIG. 2. The following first lists the elements of FIG. 4, then their connections, and finally describes the elements and their operation.

FIG. 4 includes the following elements: a resistor R1 411, a capacitor C1 413, an amplifier AMP1 416, a pass gate 417, a resistor R3 419, a resistor R2 421, a capacitor C2 423, an amplifier AMP2 426, a pass gate 427, a resistor R4 429, a capacitor C3 433, and an amplifier AMP3 436. The input signals are a five MHz signal 410 and a ten MHz signal 415. The output signal is the sine wave signal 234.

This paragraph describes the interconnections between the elements of FIG. 4. The five MHz signal 410 is coupled to the resistor R1 411. The other end of the resistor R1 411 is coupled to the input of the AMP1 416. The capacitor C1 413 is coupled across the input and output of the AMP1 416. The output of the AMP1 416 is coupled to the input of the pass gate 417. The output of the pass gate 417 is coupled to the resistor R3 419. The control signals for the pass gate 417 are coupled to the five MHz control signals. The other end of the resistor R3 419 is coupled to the input of the AMP3 436. The ten MHz signal 415 is coupled to the resistor R2 421. The other end of the resistor R2 421 is coupled to the input of the AMP2 426. The capacitor C2 423 is coupled across the input and output of the AMP2 426. The pass gate 427 is coupled to the output of the AMP2 426. The other end of the pass gate 427 is coupled to resistor R4 429. The control signals for the pass gate 427 are coupled to the ten MHz control signals. The other end of the resistor R4 429 is coupled to the input of the AMP3 436. The capacitor C3 433 is coupled across the input and output of the AMP3 436. The transmit signal 230 is the output of the AMP3 436. Thus, the connections between the elements of FIG. 4 have been described.

In one embodiment, the elements of FIG. 4 have the following values as shown in Table 1.

TABLE 1

| Element | Value |
| --- | --- |
| R1 411 | 5 KΩ |
| R2 421 | 2.5 KΩ |
| R3 419 | 5 KΩ |
| R4 429 | 2.5 KΩ |
| C1 413 | 5 pF |
| C2 423 | 5 pF |
| C3 433 | 5 pF |

The following describes the operation of the double integration circuit of FIG. 4. The five MHz signal 410 and the ten MHz signal 415 are square waves which, in combination, correspond to the square wave signal 231. However, unlike the system of FIG. 2, two separate square waves are combined and integrated at the simultaneously. The resistor R1 411, the capacitor C1 413, and the AMP1 416 operate together to integrate the square wave five MHz signal 410. Similarly the resistor R2 421, the capacitor C2 423, and the AMP2 426 operate together to integrate the ten MHz signal 415. These two integration circuits produce two triangle wave signal that correspond to the triangle wave signal 233.

The two triangle wave signals are now combined and integrated. The pass gate 417 selectively lets the integrated five MHz signal 410 through to the next integration circuit. Similarly, the pass gate 427 selectively lets the ten MHz signal 415 through to the next integration circuit. These pass gates are controlled by separate control signals that correspond to a Manchester encoded ethernet data signal.

The second integration circuit operates as follows. Depending upon which pass gate is on, the resistor R3 419 or the resistor R4 429 operate in conjunction with the capacitor C3 433 and the AMP3 436 to integrate the output of the first integration circuits. The pass gate 417 and the pass gate 427 selectively let the integrated five MHz signal 410 or the integrated ten MHz signal 415 through to the second integration circuit. The second integration circuit takes the triangle wave received at the input of AMP3 436 and generates a sinusoidal signal that corresponds to the sine wave signal 234.

FIG. 5 illustrates the various signals at different points in the double integration circuit of FIG. 4. Note that the five MHz signal 410 is a square wave, as is the ten MHz signal 415. The signal at point A is a triangle wave corresponding to the five MHz signal 410. While the signal at point B corresponds to the ten MHz signal 415. The transmit signal 230 is shown as a double integrated sine wave that is a combination of the signals from point B and point A. FIG. 6 illustrates the frequency response of various signals in the double integration circuit of FIG. 4. The square wave frequency response 610 shows that the second, third, fourth and fifth harmonic are all less than twenty dB below the fundamental ten MHz frequency. The triangle wave frequency response 620 shows that the first harmonic is approximately twenty dB below the fundamental frequency. For the both square wave and the triangle wave, the power levels of the high frequency harmonics are too high for good electromagnetic interference characteristics. However, once the last integration stage of the double integration circuit is performed, the sine wave signal 234 frequency response 630 has very low power levels at high frequency harmonics. Importantly, the very high frequency components are significantly reduced relative to the square wave and the triangle wave signals. Also note that the, this output signal includes relatively small levels of signals that are not ten MHz, five MHz, or are needed to transition between the ten MHz and five MHz. These last frequencies are shown as the two bumps around the ten MHz and five MHz frequencies. Note, this last set of frequencies make the transition between the two frequencies possible.

Note that the power level of the harmonic at thirty MHz is not quite below twenty-seven dB, as required by the FCC/CISPR-B specification. However in one embodiment, additional filters at the output of the ethernet controller 201 reduce the thirty MHz power level. In one embodiment, a transformer integrated onto the network interface card 200 includes parasitic characteristics that further filter the higher frequency harmonics. Such an integrated transformer is described in the U.S. patent application Ser. No. 08/641,375, U.S. Pat. No. 5,801,602, and entitled "Isolation and Signal Filter Transformer," having inventors Marwan A. Fawal, and Anthony Pan, which is incorporated herein by reference.

The following describes the operational amplifiers (op-amps) used in the double integration circuit of FIG. 4. The op-amps include a weak folded cascode operational amplifier. One embodiment of such an operational amplifier is shown in FIG. 7.

The following first lists the elements of FIG. 7, then their interconnections, and then their operation. The op-amp of FIG. 7 is implemented using a CMOS fabrication process. FIG. 7 includes the following p-type transistors: T1 710, T2 720, T3 730, T4 740, T5 750, T8 780, and T9 790. FIG. 7 also includes the following n-type transistors: T6 760, T7 770, T10 701, and T11 711.

The interconnection between the elements of FIG. 7 are now described. The reference voltage for the amplifier couples to the gate of T1 717. The drain of T1 710 couples to VDD and the source couples to the drains of T2 720 and T3 730. The plus input couples to the gate of T2 720 while the minus input couples to the gate of T3 730. The source of T2 720 couples to a first column of transistors. The source of T3 730 couples to a second column of transistors. The first column of transistors includes T4 740 which has its drain coupled to VDD and its source coupled to the drain of T5 750. The source of T5 750 couples to the source of T6 760. The drain of T6 760 couples to the source of T2 720 and to the source of T7 770. The drain of T7 770 couples to VSS. T3 730, T8 780, T9 790, T10 701, and T11 711 are coupled in similar fashion. Also the gates of the following fairs of transistors are coupled together: T4 740 and T8 780; T5 750 and T9 790; T6 760 and T10 701; and, T7 770 and T11 711. The output of the op-amp couples to the source of T9 790. The resulting operational amplifier has a high output impedance and a resulting high gain.

Thus, one embodiment of a double integration circuit has been described, however, other embodiments of the invention have additional features. One embodiment of the invention includes additional op-amps or transistor pairs. These op-amps or transistor pairs are configured to replace the resistors, which can be difficult to reliably manufacture on semiconductor surfaces.

d. Digital to Analog Converter with Look Up Table

In one embodiment the double integration circuit is replaced by a digital to analog converter (DAC) circuit. This embodiment includes a DAC coupled to a memory containing the values for generating a sinusoidal signal. The memory is used as a lookup table for the values to be supplied to the digital analog converter. In one embodiment, an eight bit DAC is used. In this embodiment, the ethernet controller 201 includes the DAC and the memory. In this embodiment the harmonic at thirty MHz is more than thirty-three dB below the power of the fundamental ten MHz signal. All the other harmonics are below the value of the third harmonic. Thus, this embodiment, meets the FCC electromagnetic interference specification.

FIG. 8 illustrates one embodiment of a DAC circuit that may used in an embodiment invention. The following first lists the elements of FIG. 8, their interconnections, and then their operations.

FIG. 8 includes the following elements: an operational amplifier 810; a transistor TRef 870; a transistor TPlus 830; a transistor TMinus 832; a resistor RRef 844; a resistor RP 842; a capacitor CP 840; a capacitor CM 860; a resistor RM 848; and, eight stages of circuits such as stage 820. The stage 820 includes an inverter 824 and a number of transistors, Ts1 821, Ts2 822 and Ts3 823.

The elements of FIG. 8 are coupled as follows. An eight bit level select signal 801 is provided to the eight stages. Each bit of the level select signal 801 is coupled to a different stage. A stage is connect to as follows. A select bit input is coupled to the inverter 824. The input bit is also coupled to the gate of the transistor Ts2 822. The inverted signal is coupled to the gate of transistor Ts3 823. The drains of the transistor Ts2 822 and the transistor Ts3 823 are coupled to the source of the transistor Ts1 821. The gate of the transistor Ts1 821 is coupled to the output of the op-amp 810. The drain of the transistor Ts1 821 is coupled to VDD. The source of transistor Ts2 822 is coupled to the positive output of the DAC. The source of the transistor Ts3 823 is coupled to the negative output of the DAC. The drains of the transistor TRef 870, TPlus 830 and TMinus 832 are all coupled to the VDD. The gates of each of these transistors are coupled to the output of the op-amp 810. The source of the transistor TRef 870 couples to the resistor RRef 844. The other end of the resistor RRef 844 couples to VSS. The source of the transistor TPlus 830 couples to the positive output of the DAC, to the capacitor 840, and the resistor RP 842. The other ends of the capacitor 840 and the resistor RP 842 couple to VSS. The transistor TMinus 832 has its source coupled to the negative output and to the capacitor 860 and resistor 848. The capacitor 860 and the resistor 848 are coupled at the other ends to VSS. The positive input of the op-amp 810 is coupled to the source of the transistor TRef 870. A reference voltage 802 is applied to the minus input of the op amp 810.

In this embodiment, the various stages are enabled according to the level select 801 bits. The level select 801 bit values are determined from the values in the memory. A state machine cycles accesses the memory values and provides them to the level select 801 bits. Depending upon whether the Manchester encoded data is represented by a ten MHz signal or a five MHz signal at a given point in time, the state machine will access the values in the memory that will generate a ten MHz sine wave signal or a five MHz sine wave signal. By selecting the various stages, a sine wave is approximated at the DAC outputs. Each stage provides voltage to the DAC outputs. The amount of voltage is determined by the size of the Ts1 821 transistors. The sizes of the transistors Ts1 821 allow one embodiment of the invention to have an output which is an acceptable approximation of a sine wave. The size of a transistor Ts1 821 determines the gain of that stage. In one embodiment the relative size of the transistors are as follows. Stages 1 and 8 have the smallest transistors Ts1 821. Stages 2, 3, and 4 have increasingly larger transistors Ts1 821. Each transistor is two times, three times, and four times as large as the smallest transistor (the stage 1 transistor), respectively. Stage 5, 6, and 7 have transistor sizes which are four times, three times, and two times the size of the stage 5 transistor, respectively. In other embodiments, the transistors Ts1 821 are the same size and different multiples of the smallest transistor size.

In another embodiment of the invention, the resistors RM 848, RP 842 and RREF 844 are all replaced with op-amps, or transistor pairs, configured to act like resistors.

In another embodiment of the invention, the plus and minus outputs of the DAC are fed through a filter, such as the filter described in the above referenced United States patent application or as is available from VALOR Incorporated.

In another embodiment of the invention, a state machine replaces the memory.

Thus, a DAC and memory circuit for generating a varying ten MHz and five MHz signal for use in ethernet communications has been described. The following describes additional embodiments of the invention.

In another embodiment of the invention, a first stage of integration is performed in the ethernet controller 201. The output triangle wave signal is buffered and then fed into the integrated transformer described in the above referenced United States patent application. The integrated transformer reduces some of the high frequency harmonics of the triangle wave signal.

What is claimed is:

1. A system comprising:
    an ethernet controller circuit for generating ethernet data signals; and
    an isolation circuit coupled to receive the ethernet data signals and for generating ethernet output signals, said ethernet output signals including primarily a first sine wave signal, a second sign wave signal, and a set of signals, said first sine wave signal being at a frequency approximately equal to the frequency of the ethernet data signals, said second sine wave signal being at a frequency approximately one half the frequency of the first sine wave signal, said third set of signals for transitioning between said first sine wave signal and said second sine wave signal.

2. The system of claim 1 wherein the ethernet controller circuit includes a double integration circuit and wherein the double integration circuit, said double integration circuit coupled to receive at least a first square wave input and to generate said ethernet data signals so as to Manchester encode data.

3. The system of claim 2 wherein the double integration circuit includes:
    a first integration circuit coupled to receive a first square wave at the frequency of the ethernet data signals and to generate a first triangle wave;

a second integration circuit coupled to receive a second square wave at a frequency of one half the frequency of the ethernet data signals and to generate a second triangle wave;

a first switch coupled to selectively output the first triangle wave in response to a first data encoding signal;

a second switch coupled to selectively output the second triangle wave in response to a second data encoding signal;

a third integration circuit coupled to the output of the first switch and the output of the second switch, the third integration circuit for generating the ethernet data signals.

4. The system of claim 3 wherein the first integration circuit includes an RC operational amplifier integration circuit.

5. The system of claim 3 wherein the first integration circuit includes a transistor acting as a resistor, a capacitor and a operational amplifier configured as an integration circuit.

6. The system of claim 1 wherein the ethernet controller circuit includes a digital to analog converter and a state machine, the digital to analog converter for generating the ethernet data signals as an approximation of a sine wave varying between the frequency of the ethernet data and one half the frequency of the ethernet data.

7. The system of claim 1 wherein the isolation circuit includes an isolation transformer and wherein the isolation transformer is for electrically isolating the ethernet controller circuit and for filtering high frequency components from the ethernet data signals.

8. The system of claim 1 wherein the ethernet controller includes a buffer for buffering the ethernet data signals prior to communicating the ethernet data signals to the isolation circuit.

9. The system of claim 1 further comprising a network interface card and wherein the ethernet controller is formed on a semiconducting substrate and wherein the isolation circuit includes a transformer located on the network interface card.

10. A circuit for generating ethernet signals comprising:

a sine wave generating circuit having a sine wave output, said sine wave generating circuit for generating a positive sine wave signal and a negative sine wave signal at the sine wave output, the positive sine wave signal and the negative sine wave signal representing a Manchester encoded ethernet data signal, the positive sine wave signal and the negative sine wave signal having substantially the shape of a sine wave varying between a first frequency and one half the first frequency; and an isolation transformer coupled to the sine wave output and having an ethernet signal output, said isolation transformer filtering high frequency signals from signals received from said ethernet signal output.

11. The circuit of claim 10 wherein the sine wave generating circuit is formed substantially as one integrated circuit.

12. The circuit of claim 10 wherein signals from the ethernet signal output conform to the ANSI/IEEE 802.3 voltage template.

13. The circuit of claim 10 wherein the sine wave generating circuit includes a double integration circuit for double integrating square waves to generate signals for the sine wave output.

14. The circuit of claim 10 wherein the isolation transformer is formed on a substrate, wherein the substrate supports an integrated circuit including the sine wave generating circuit, and wherein the isolation transformer has parasitic characteristics which inhibit the transmission of some high frequency signals.

15. The circuit of claim 10 wherein the signals form the ethernet signal output have a fundamental frequency of ten MHz.

* * * * *